| United States Patent [19] | [11] 3,887,606 |
| Phillipps et al. | [45] June 3, 1975 |

[54] PROCESS FOR THE PREPARATION OF DL-PHENYLGLYCINE ESTERS

[75] Inventors: Gordon Hanley Phillipps, Wembley; Leslie Stephenson, Hanwell; Albert Roy Cooksey, Torver; John Colin Clark, Gerrards Cross, all of England

[73] Assignee: Glaxo Laboratories Limited, Greenford, Middlesex, England

[22] Filed: June 2, 1972

[21] Appl. No.: 259,298

[30] Foreign Application Priority Data
June 2, 1971 United Kingdom............... 18675/71

[52] U.S. Cl.......................... 260/471 A; 260/518 R
[51] Int. Cl........................................... C07c 101/06
[58] Field of Search................................ 260/471 A

[56] References Cited
UNITED STATES PATENTS
2,750,404   6/1956   Vercellone et al. ............ 260/471 A Primary Examiner—Lorriane A. Weinberger
Assistant Examiner—L. A. Thaxton
Attorney, Agent, or Firm—Bacon & Thomas

[57] ABSTRACT

A process for the resolution of DL-phenylglycine esters in which said ester is treated with (+)-tartaric acid in the presence of a mixture of solvents of different polarities, one of which is an alkanol having 1–4 carbon atoms, and the (+)-hermitartrate of the D-phenylglycine ester is selectively crystallised therefrom. D-phenylglycine and/or its salts may be obtained by hydrolysis of the ester thus formed.

D-phenylglycine is a valuable intermediate in the synthesis of antibiotics of the penicillin and cephalosporin types. The present invention provides a relatively cheap, high yield process for the production of optically active esters of phenylglycine by way of their diastereoisomeric salts and for the production of optically active phenylglycine therefrom. Novel D-phenylglycine esters and salts are disclosed.

18 Claims, No Drawings

PROCESS FOR THE PREPARATION OF DL-PHENYLGLYCINE ESTERS

The present invention relates to a novel process for the production of optically active esters of phenylglycine by way of their diastereoisomeric salts and to the production of optically active phenylglycine therefrom.

In the pharmaceutical industry, D-phenylglycine (D-2-amino-2-phenylacetic acid) is a valuable intermediate in the synthesis of antibiotics, e.g. 6β-(D-2-amino-2-phenylacetamido) penicillanic acid (ampicillin), 7β-(D-2-amino-2-phenylacetamido)-3-methylceph-3-em-4-carboxylic acid (cephalexin), 3-acetoxymethyl-7β-(D-2-amino-2-phenylacetamido) ceph-3-em-4-carboxylic acid (cephaloglycin), 7β-[D-2-amino-2-(1,4-cyclohexadien-1-yl)-acetamido]-3-methylceph-3-em-4-carboxylic acid, and 6β-[D-2-amino-2-(p-hydroxyphenyl)acetamido] penicillanic acid (amoxycillin) and others.

A commercial method used at present for resolving the zwitterionic DL-2-amino-2-phenylacetic acid requires the use of a strong optically active acid to form a salt of both D- and L-enantiomers, and relies upon the difference in solubility found in such salts in order to effect a separation of the D- and L-enantiomers. The acid most favoured for carrying out this separation on a production scale is the expensive (+)-10-camphorsulphonic acid which is prepared from natural camphor by sulphonation. The economics of processes employing (+)-10-camphorsulphonic acid are thus markedly dependent on efficient recovery of this acid, a process which proves plant and labour intensive, and therefore costly, in practice on a commercial scale.

Whilst the resolution of N-acyl DL-2-amino-2-phenylacetic acid has been described by several workers (Fischer & Weichhold, Ber. 1908, 31 1286; Lutz, Ber., 1932, 65 1609; Potapov et al., Chem. Abstr. 1966, 65 7029; Minovici, Bull soc. chim. Romania, 1920, 2, 8 - see Chem. Abstr. 1920, 14, 3228; Gottstein and Cheney J.Org.Chem., 1965, 30, 2072) the optically active bases employed are generally expensive. Added to this expense the high molecular weight of the optically active bases is such that large quantities are required for stoichiometric salt formation wtih the N-acylate. Furthermore, hydrolysis of the optically active acylates of the 2-amino-2-phenylacetic acid produced by such resolution processes usually results in some undesirable racemization leading to optically impure 2-amino-2-phenylacetic acid.

In order to avoid using strong optically active acids, it has been proposed to resolve the DL-phenylglycine in the form of an ester, thus enabling cheap readily available optically active carboxylic acids to be used. However, it has not previously proved possible to effect a single stage crystallisation giving the desired product in acceptable yield and of acceptable optical purity. Losse et al. (Chem. Ber. 1958, 91, 2410) have described a resolution of ethyl DL-phenylglycinate with dibenzoyl L(+)-tartaric acid in which the initial crystallisation was inefficient and fractional crystallisation of the salts was required. However, dibenzoyl L(+)-tartaric acid offers little economic advantage over (+)-10-camphorsulphonic acid and a multi-stage fractionation process for the separation of the optical enantiomers makes considerable demands on both plant and labour and is thus not an attractive commercial proposition. Losse et al. further found that in their hands hydrolysis of the resolved ethyl ester led to loss of optical purity owing to partial racemisation during the hydrolysis, suggesting that resolution of esters of phenylglycine was not commercially worthwhile.

In our copending patent U.S. application Ser. No. 221,810 we have shown that esters of DL-phenylglycine may be obtained readily in good yields from 2-phenylacetic esters, some of which are available in large quantities as waste by-products from the production of semi-synthetic penicillin and cephalosporin antibiotics. It is thus highly desirable commercially to be able to resolve these relatively cheap esters of DL-phenylglycine successfully and cheaply.

Surprisingly we have now found that it is possible by selecting the right conditions to resolve these readily available DL-esters using (+)-tartaric acid, which is very readily available, and to obtain the salt of the desired D-phenylglycine ester in good yields in high optical purity, in a single crystallisation step, thus avoiding a time-consuming fractionation procedure. Furthermore, by using selected conditions it is possible to convert the resolved esters in high yields into D-phenylglycine with little or no loss of optical purity, in contrast to the previous finding of Losse.

In addition to this, the unwanted isomer in the mother liquors may be simply racemised and this mixture resolved and hydrolysed as before to achieve a high conversion of racemic ester into the optically active isomer.

According to the present invention we provide a process for the resolution of a DL-phenylglycine ester of the formula:

$$C_6H_5 \cdot CH \cdot NH_2 \cdot CO_2R$$

I where R represents an alkyl group with 1 to 6 carbon atoms or a cycloalkyl group with 5 to 6 carbon atoms which comprises treating said DL-phenylglycine ester of formula I with (+)-tartaric acid in the presence of a mixture of solvents of different polarities one of which is an alkanol having 1–4 carbon atoms, and selectively crystallising the (+)-hemitartrate of the D-phenylglycine ester therefrom.

The (+)-hemitartrate salts of the esters of formula I in substantially optically pure form are new compounds and constitute a further feature of the invention.

DL-phenylglycine esters of formula I are preferably used in which R represents a methyl, ethyl, isopropyl, butyl, isobutyl or cyclohexyl group.

We have found that although the ester hemitartrates can be partially resolved by crystallisation from a single solvent such as an alkanol, a more efficient resolution can be effected by using a mixed solvent, containing an alkanol together with a solvent having a significantly different polarity. In general, there will be a predominant proportion of the alkanol.

While we do not wish to be bound by theoretical considerations, it is believed that the D-phenylglycine ester hemitartrate more readily forms a solvate with the alkanol solvent than does the L-isomer. It is this solvate which is normally crystallised initially, although the alkanol can be removed by drying, methanol usually being more loosely bound than ethanol. The L-isomer is not normally recovered in the form of such a solvate.

In general, the solvent mixture will contain, in addition to the alkanol, a solvent selected from the following: water; sulphoxide solvents such as dimethyl sulphoxide; amide solvents such as formamide, dimethyl formamide, dimethylacetamide and hexamethyl phosphoramide; nitrile solvents such as acetonitrile; ester solvents such as methyl and ethyl acetate; carboxylic acids such as acetic and propionic acid; hydrocarbon solvents such as benzene and toluene; and chlorinated hydrocarbon solvents such as methylene chloride or dichloroethane.

The solvent mixture preferably contains predominantly the alkanol, especially methanol or ethanol, or a mixture of such alkanols such as industrial methylated spirit (I.M.S.).

In a preferred embodiment of the process, the solvent mixture comprises an alkanol containing a small proportion e.g. 1–20 percent, preferably 5–15 percent, v/v, of a more polar cosolvent advantageously a sulphoxide solvent such as dimethyl sulphoxide; water; an amide solvent such as formamide, dimethyl formamide or hexamethyl phosphoramide; a nitrile solvent such as acetonitrile; or an ester solvent such as methyl acetate. Inclusion of these co-solvents has been found to increase the purity of the product although lowering slightly the yield obtained. With inclusion of water, an optimum of about 10 percent by volume provides good yields of acceptable purity. Alternatively, a less polar solvent may be included, for example a hydrocarbon or a chlorinated hydrocarbon such as methylene chloride, dichloroethane or benzene; or a carboxylic acid such as acetic or propionic acid.

Although aqueous lower alkanols generally are suitable as solvents, and ethanol containing dimethyl sulphoxide or acetic acid is also generally useful, it has been found particularly advantageous to use aqueous methanol or aqueous ethanol in resolving ethyl DL-phenylglycinate and aqueous ethanol or aqueous I.M.S. in resolving methyl DL-phenylglycinate.

The salt-forming reaction is preferably effected at ambient or slightly elevated temperature, e.g. 15° to 60°C, or even under reflux, preferably 40° to 50°C, subsequently cooling to obtain crystallisation. In general, the upper and lower temperatures of crystallisation fall within the range −20° to +60°C, preferably 0° to 20°C. It is particularly desirable to form the salt at temperatures between 20° and 60°C, and then carefully to cool the reaction mixture at a controlled rate whereby steady crystallisation is obtained yielding a particularly pure product. Seeding the solution with a crystal of the desired pure D-salt is also beneficial.

The tartaric acid may be used in a stoichiometric amount or in excess, e.g. up to 100 percent excess. Optimal yields have been obtained using from 1 to 1.75 moles of the acid.

The concentration of the unresolved phenylglycine ester in the solvent mixture may in general be from 1 to 20 percent w/v, but this will obviously vary with the alkanol. With the inclusion of 10 percent water, we have found that preferred concentrations of the ester are for methanol about 15 percent w/v, for ethanol from 2 to 5 percent w/v and for I.M.S. from 5 to 10 percent w/v.

In general, the smaller the quantity of co-solvent which is used, the lower the concentration of the phenylglycine ester starting material.

When resolving an ester prepared according to the process of our said copending application, it is convenient to add the tartaric acid directly to the crude filtrate from the final stage which is normally hydrogenation. Where the hydrogenation solvent would be undesirable, the crude mixture may be evaporated and the residue dissolved in the solvent of choice.

The conversion of the salts of optically active 2-amino-2-phenylacetic acid esters into optically active 2-amino-2-phenylacetic acid may be carried out by first removing the (+)-tartaric acid, e.g. on a basic ion exchange column or by formation of an insoluble tartrate, e.g. by addition of a calcium salt, e.g. calcium chloride, or ammonia and hydrolysing the free optically active 2-amino-2-phenylacetic ester, e.g. in a boiling dilute solution of a strong acid. Alternatively the free optically active 2-amino-2-phenylacetic ester may be obtained by neutralising the optically active hemitartrate with a base, e.g. aqueous ammonium hydroxide or sodium bicarbonate to ca. pH7 and extracting with an organic solvent. Care must be exercised in releasing the free optically active 2-amino-2-phenylacetic ester since the use of base in this process can lead to racemisation of the optically active 2-amino-2-phenylacetic ester In addition the optically active 2-amino-2-phenylacetic ester can itself racemise, especially on warming.

Because of the risk of racemisation we have found it advantageous simply to hydrolyse the hemitartrate of the optically active 2-amino-2-phenylacetic ester under acid conditions (i.e. one avoids releasing the free optically active amino ester). Alternatively the hemitartrate may be converted into another salt before hydrolysis. When the process is operated in any of these ways no or very little racemisation occurs, and 2-amino-2-phenylacetic acid of good optical purity can be obtained.

Thus according to a further feature of the present invention, D-phenylglycine may be obtained by hydrolysing the obtained D-ester (+)hemitartrate in an aqueous solution of a strong acid, such as a mineral acid or an alkane- or arylsulphonic acid or a halogenated carboxylic acid, e.g. hydrochloric, hydrobromic, hydriodic, sulphuric, phosphoric, perchloric, trifluoroacetic, methanesulphonic or p-toluene sulphonic acid.

The hydrolysis reaction may be carried out at −10° to +200°C and is conveniently effected at the boiling point of the aqueous acid solution. It has been found that even at the boiling point little or no racemisation occurs.

The product of the hydrolysis is a solution containing a salt of the optically active 2-amino-2-phenylacetic acid. The optically active 2-amino-2-phenylacetic acid may be liberated by adjusting the pH of the hydrolysis mixture with a base to a pH in the range 4-9, preferably 6-7, and filtering.

Clearly to minimise the usage of base in the pH adjustment step the amount of acid is preferably reduced to a minimum. We have found that very concentrated slurries of optically active 2-amino-2-phenylacetic ester salts can be converted into optically pure 2-amino-2-phenylacetic acid in very high yield, enabling considerable economies in reagent costs to be made.

The (+)-tartaric acid may be recovered from the mother liquors by conventional techniques and recycled.

Further economies in process costs may be made by recovering the unwanted optical isomer from the mother liquors after filtering off the insoluble salt of the desired optically active 2-amino-2-phenylacetic ester and the (+)-tartaric acid. If desired, the (+)-tartaric acid can be removed, e.g. on a basic resin column. The unwanted enantiomer may then be racemised by heating alone, or with a weak acid such as acetic acid or a base such as ammonia or an alkali metal alkoxide or hydroxide. Dry conditions are, however, preferably since the presence of water can cause hydrolysis thus necessitating the re-esterification of any DL-2-amino-2-phenylacetic acid so formed. In many cases, it is thus more convenient to racemise the (+)-hemitartrate of the L-enantiomer by heating in dry form or in solution e.g. in dry methanol or ethanol, advantageously in the presence of a slight excess of tartaric acid. Although in alcoholic solvents some trans-esterification may occur, this simple racemisation step leads to a valuable yield of D-phenylglycine and thus renders the process even more commercially viable. The problem of hydrolysis during recovery of the other optical isomer when water is present in the medium, is avoided by an alternative embodiment of the resolution process mentioned above, namely the use as solvent of an alcohol, e.g. methanol or ethanol, and a hydrocarbon or chlorinated hydrocarbon, e.g. methylene chloride, dichloroethane or benzene; an amide e.g. formamide, dimethylformamide, hexamethyl phosphoramide; acetonitrile; an ester, e.g. methyl acetate; a sulphoxide such as dimethyl sulphoxide or a carboxylic acid such as acetic acid.

In general, strongly electron-donating solvents such as sulphoxides and acids favour racemisation and when these are used as co-solvents in the resolution process, the same solvent mixture can be used in the racemisation stage.

It has further been found that some racemisation occurs during the resolution process so that the yield of the desired D-isomer may then be more than 100 percent based on the D-isomer initially present. The presence of strongly electron-donating solvents such as sulphoxides and acids has been found to accelerate this process. The racemisation is rapid at 60°C and is significant even at 20°C. At such lower temperatures, the resolution should be allowed to continue for a prolonged period e.g. several days in order to obtain a useful level of racemisation. Thus, for example, using sulphoxide or acid co-solvents yields as high as 130 percent have been observed.

Coupled with the process described in our above mentioned copending application, the process of the present invention provides a particularly convenient and economic route to D-phenylglycine from esters of phenylacetic acid.

Thus in the combined process, a phenylacetic acid ester is reacted with a base and an organic nitrosating agent to yield a 2-nitrosated phenylacetic ester. This nitrosated intermediate, without first separating the various reaction products which may be present, is then reduced to afford the DL-phenylglycine ester which can then be resolved according to the present invention, preferably without prior isolation and purification.

The phenylglycine ester starting materials may also be prepared by direct esterification of DL-phenylglycine.

The following examples further illustrate the invention.

Samples of hemitartrates which were dried at 70-80°C at 2mm. were unsolvated. Ethanol crystallisates dried at 20°-40°C and 2 mm. were solvated usually with 1 mol. of ethanol. The yields and rotations of ethanol solvates have been corrected to allow for the solvation. When ethanol solvates have been dried to drive off the solvent the product picks up atmospheric water to give a hemihydrate; the yields and rotations of such hemihydrates have not been corrected.

I.M.S. containing 10 percent water was made from I.M.S. which had previously been dried and distilled. Ethanol containing 10 percent water was made from Burroughs Absolute ethanol. Melting points are uncorrected and were measured on a Kofler block. Unless otherwise stated, temperatures are in °C:

EXAMPLE 1

Resolution of Pure Methyl DL-phenylglycinate in Ethanol.

To a solution of (+)-tartaric acid (3.0g; 0.02 mole) in aqueous ethanol (100 ml) (EtOH: $H_2O$ 90:10 v/v) kept at about 50°C was added pure methyl DL-phenylglycinate (3.3g: 0.02 mole). The solution was allowed to cool to 5°C and to stand at this temperature for 16 hours. The hemitartrate crystals formed were filtered, washed with aqueous ethanol and dried under vacuum at 40°C to yield methyl D-phenylglycinate (+)-hemitartrate (3.0g; 83 percent) $[\alpha]_D^{20}$ −63.0° ($H_2O$); m.p. 143°–145°C (with decomp) n.m.r. DMSO-$d_6$ : 5 protons 7.43 δ ($C_6H_5$) (Multiplet) 1 proton 5-03 δ (s) 2 protons 4.15 δ (s) 3 protons 3.68 δ (methyl)(s) i.r. (nujol) 3460 cm.$^{-1}$(SH) 3370 cm.$^{-1}$(M) 1760 cm.$^{-1}$(S).

EXAMPLE 2

Resolution of Pure Ethyl DL-phenylglycinate in Methanol.

To a solution of (+)-tartaric acid (8.4g; 0.056 mole) in aqueous methanol (65ml) (MeOH: $H_2O$ 90:10 v/v) kept at about 60°C was added pure ethyl DL-phenylglycinate (10g: 0.056 mole) The solution was allowed to cool to 5°C and kept at this temperature for 16 hours. The hemitartrate crystals were filtered off, washed with aqueous methanol (10ml) and dried under vacuum at 40°C to give ethyl D-phenylglycinate (+)-hemitartrate (7.4g; 80.4 percent) $[\alpha]_D^{20}$ −43° ($H_2O$); m.p. 123.5°–127.5°C.

EXAMPLE 3

Resolution of Pure Isopropl DL-phenylglycinate in Ethanol.

To a solution of (+)-tartaric acid (3.87g: 0.026 mole) in aqueous ethanol (175 ml) (EtOH: $H_2O$ 90:10 v/v) kept at about 60°C, was added pure isopropyl DL-phenylglycinate (5.0g: 0.026 mole). The solution was allowed to cool to 5°C and kept at this temperature for 16 hours. The hemitartrate crystals were filtered off, washed with aqueous ethanol and dried under vacuum at 40°C to give isopropyl D-phenylglycinate (+)-hemitartrate (3.58g: 71.0 percent) $[\alpha]_D^{20}$ −35° ($H_2O$); m.p. 149°–150°C. A sample redried to remove ethanol had m.p. 149°–150°C, $\nu_{max.}$ (Nujol) 3320 and 3272 (OH), 2730 ($NH_3+$), 1735 ($CO_2CHMe_2$), 1572 ($CO_2^-$) and 1670 cm$^{-1}$($CO_2H$), τ ($D_3CSOCD_3$) 2.56 (5H,s; Ph), 5.12 (1H,s,CHPh) 5.88 (2H,s; tartrate) 5.0 (1H, septet, $J6H_z$; CH of isopropyl) 8.72 (3H,d, $J6H_z$; $CH_3$ of isopropyl), 8.84 (3H,d,$J6H_z$;other $CH_3$ of isopropyl, magnetic non-equivalence) (Found: C, 51.15; H, 6.1;

N,3.8. $C_{15}H_{21}NO_8 \cdot 0.5H_2O$ requires C,51.2; H, 6.3; N,4.0 percent).

EXAMPLE 4

Resolution of Pure Methyl DL-phenylglycinate.

A solution of recrystallised methyl DL-phenylglycinate (383 mg: 2.32 m.mole) in I.M.S. containing 10 percent water (4 ml.) was filtered into a warm solution of (+)-tartaric acid (365mg: 2.42 m.mole, 1.04 equiv.) in the same solvent (4 ml.). The homogeneous solution was seeded with an earlier sample of the D-hemitartrate (clusters of very small needles, $[\alpha]_D-62.5°$). The product crystallised in an hour at 20°, was filtered and dried at 70°/12 mm for 16 hours to give small needles of the hemitartrate (236 mg; 70 percent) m.p. 139°–141°, $[\alpha]_D^{22}-62.5°$ (C 1.04, $H_2O$), $\nu_{max}$. (Nujol) 3475 to 2640 [OH and $NH_3^{(+)}$], 1740 and 1250 ($CO_2Me$) 1730 to 1650 ($CO_2H$), 1587 ($CO_2^-$), and 690 and 737 cm$^{-1}$ (Ph), $\tau$ ($D_3CSOCD_3$) 2.6 (5 proton singlet; Ph) 5.1 (1 proton singlet; PhCH), 5.88 (2 proton singlet; [CHOH]$_2$) 6.3 (3 proton singlet; $CO_2Me$). (Found: C, 47.6; H, 5.25; N, 4.1, $C_{13}H_{17}NO_8$ 0.5 $H_2O$ requires C, 47.85; H, 5.5; N, 4.3 percent).

EXAMPLE 5

Resolution of the Crude Reaction Mixture from the Hydrogenation of the Oxime of Methyl Phenylacetate in Ethanol.

Half of the final filtered solution from the hydrogenation reaction described in Example 1 of the Specification of U.S. application Ser. No. 221,810 was evaporated under vacuum to leave an oily residue containing crude esters of phenylglycine (approx. 3.8g: 0.024 mole)

This residue was added to a solution of (+)-tartaric acid (4.0g: 0.025 mole) in aqueous ethanol (100 ml) (EtOH: $H_2O$ 90:10 v/v) at about 50°C. The warm solution was filtered and, when cool, seeded with methyl D-phenylglycinate (+)-hemitartrate crystals and allowed to stand at 5°C for 16 hours. The hemitartrate crystals were filtered off, washed with aqueous ethanol and dried under vacuum at 40°C to yield methyl D-phenylglycinate (+)-hemitartrate (2.41g: 55.5 percent) $[\alpha]_D^{20}-60.5°$ ($H_2O$).

EXAMPLE 6

Resolution of the Crude Reaction Mixture from the Hydrogenation of the Oxime of Methyl Phenylacetate Using Tartaric Acid in Ethanol.

To a final filtered solution in ethanol (45 mls) from a hydrogenation reaction (similar to that described in Example 5) containing crude esters of phenylglycine (approx. 2.1g; 0.012 mole), was added (+)-tartaric acid (1.9g; 0.0125 mole) in water (5 ml) at about 50°C. The warm solution was filtered and when cool seeded with methyl D-phenylglycinate (+)-hemitartrate crystals and allowed to stand at 5° for 16 hours. The hemitartrate crystals were filtered off, washed with aqueous ethanol and dried under vacuum at 40°C to yield methyl D-phenylglycinate(+)-hemitartrate (1.18g; 52 percent) $[\alpha]_D^{20}-63.0°$. ($H_2O$).

EXAMPLE 7

Resolution of the Crude Reaction Mixture from the Hydrogenation of the Oxime of Methyl Phenylacetate Using Tartaric Acid in I.M.S.

To the final filtered solution in I.M.S. (90 mls) from a hydrogenation reaction (similar to that described in Example 5) containing crude esters of phenylglycine (approx. 4.18g; 0.024 mole), was added (+)-tartaric acid (3.8g; 0.025 mole) in water (10 ml) at about 50°C. The warm solution was filtered and when cool seeded with methyl D-phenylglycinate (+)-hemitartrate crystals and allowed to stand at 5° for 16 hours. The hemitartrate crystals were filtered off, washed with aqueous I.M.S. and dried under vacuum at 40°C to yield methyl D-phenylglycinate (+)-hemitartrate (2.10g; 46.0 percent) $[\alpha]_D-56°$ ($H_2O$).

EXAMPLE 8

Resolution of Ethyl DL-phenylglycinate with (+)-tartaric Acid a. In ethanol containing 10 percent water A solution of ethyl DL-phenylglycinate (1.057 g., 5.9 mmole) in ethanol containing 10 percent water was warmed with (+)-tartaric acid (0.949 g., 6.3 mmole, 1.07 equiv.) in the same solvent (total volume 10.5 ml.). The solution was cooled to 20° and was filtered after 16 hours and dried at 70° to give D-hemitartrate (634 mg., 66 percent) as needles, m.p. 131° to 135°, $[\alpha]_D^{23}-46°$ (c 2.5, $H_2O$), $\nu_{max}$. (Nujol) 3452 and 3400 (OH), 2620 ($NH_3+$) and 1740 cm.$^{-1}$ ($CO_2Et$), $\tau$ ($D_3CSOCD_3$) 2.71 (5H,s;Ph), 5.05 (1H,s;CHPh), 5.89 (2H,s;tartrate), 5.82 (2H,q, J7Hz; $CH_2$ of ethyl) and 8.88 (3H, t; J7Hz; $CH_3$ of ethyl). (Found: C,49.25; H,5.65; N,4.1. $C_{14}H_{19}NO_8 \cdot 0.5H_2O$ requires C,49.75; H,5.95 and N,4.15 percent).

b. In ethanol containing 20 percent water

The ester was resolved using a 20 percent solution in ethanol containing 20 percent water to give the hemitartrate (46 percent yield), $[\alpha]_D^{23}-46°$ (c 2.51, $H_2O$).

EXAMPLE 9

Resolution of Methyl DL-phenylglycinate

A solution of methyl DL-phenylglycinate (19.827 g., 120 mmole, m.p. 32°–33°, made by esterification of DL-phenylglycine with methanol/hydrogen chloride) in IMS containing 10 percent water was filtered into a warm solution of (+)-tartaric acid in the same solvent The total volume used was 290 ml., giving a 7 percent solution of the ester. A seed (clusters of small needles, $[\alpha]_D-62.5°$) was added to the warm solution and fine needles were slowly deposited. After 3 hours cooling to 20°, the thick mass was refrigerated at 3° for 15 hours, filtered, washed with chilled solvent and dried at 80° for 4 hours to give the hemitartrate (15.447 g., 82 percent) as needles, m.p. 140°–145°, $[\alpha]_D^{22}-59.5°$ (c 0.912, water) and $-60°$ (c 0.936, water) $\nu_{max}$. (nujol) 3480, 3410 (OH), 1740 and 1250 ($CO_2Me$), 1730 to 1650 ($CO_2H$), 1587 ($CO_2^-$), 737 cm$^{-1}$ (Ph), $\tau$ ($D_2O$) 2.45 (5-proton singlet; Ph), 4.66 (1-proton singlet; PhCH), 5.49 (2-proton singlet; [CHOH]$_2$), 6.18 (3-proton singlet; $CO_2Me$). (Found: C, 47.6; H, 5.2; N, 41. $C_{13}H_{17}NO_8$ 0.5 $H_2O$ requires C, 47.85; H, 5.55; N, 4.3 percent).

A sample (2.046 g.) was recrystallised from hot ethanol containing 10 percent water (20 ml.) to give needles $[\alpha]_D^{20}-62°$ (c 0.982, water) and $-61.5°$ (c 0.990, water). Another sample (2,123 g.) was recrystallised from hot IMS containing 10 percent water (20 ml.) to give needles $[\alpha]_D^{20}$ −64.5° (c 0.98, water) and −64° (c 1.019, water).

The mother liquors from the resolution were cooled to give two crops (290 mg.) and (2.435 g.) with $[\alpha]_D^{20}$ of +28.5° and +25.5° respectively.

EXAMPLE 10

Hydrolysis of Methyl D-phenylglycinate (+)-hemitartrate

Methyl D-phenylglycinate (+)-hemitartrate (1.5g: 4.8 mmoles; from Example 1) was dissolved in cold 6N hydrochloric acid (15 ml) and the mixture was then boiled under reflux for 75 min. After cooling the pH was adjusted to 7.0 with ammonium hydroxide solution. The precipitate was collected by filtration, washed with water and dried under vacuum at 38°C to yield D-phenylglycine (0.43g: 60 percent) $[\alpha]_D^{20}$ −156.8° (1N-HCl) mp 255° (with sublm.)

EXAMPLE 11

Hydrolysis at a Higher Concentration.

Methyl D-phenylglycinate(+)-hemitartrate (prepared as in Example 1; 2.0g: 6.3 mmoles) was added to cold 6N-hydrochloric acid (10 ml.) and the mixture was boiled under reflux for 75 mins. After cooling, water (10 ml.) was added and the pH adjusted to 7.0 with ammonium hydroxide solution. The precipitate was collected by filtration, washed with water and dried under vacuum at 38°C. to yield D-phenylglycine (0.72g:75.5 percent) $[\alpha]_D^{20}$ −156° (1N-HCl).

EXAMPLE 12

Hydrolysis With a Shorter Reflux Time.

Methyl D-phenylglycinate(+)-hemitartrate (prepared as in Example 1; 0.39g: 1.2 mmole) was dissolved in cold 6N-hydrochloric acid (4 ml.) and the solution was boiled under reflux for 30 mins. After cooling the pH was adjusted to 7.0 with ammonium hydroxide solution. The precipitate was collected by filtration, washed with water and dried under vacuum at 38°C. to yield D-phenylglycine (0.116g:62 percent) $[\alpha]_D^{20}$ −152° (1N-HCl).

EXAMPLE 13

Hydrolysis of Methyl D-phenylglycinate(+)-hemitartrate by Adding to Boiling 6N-HCl.

Methyl D-phenylglycinate(+)-hemitartrate (prepared as in Example 1; 2.0g: 6.3 mmole) was added portion-wise to boiling 6N-hydrochloric acid (15 ml.) at such a rate as to keep the reaction mixture boiling. After the addition was complete the mixture was boiled under reflux for 1 hour. When cool the pH was adjusted to 7.0 with ammonium hydroxide solution. The precipitate was collected by filtration, washed with water and dried under vacuum at 38°C. to yield D-phenylglycine (0.54g:55.5 percent) $[\alpha]_D^{20}$ −156°. (1.0N HCl)

EXAMPLE 14

Hydrolysis of Isopropyl D-phenylglycinate(+)-hemitartrate by Adding to Boiling 6N-HCl.

Isopropyl D-phenylglycinate(+)-hemitartrate (prepared as in Example 3; 2.0g:5.8 mmole) was added portionwise to boiling 6N-hydrochloric acid (15 ml.) at such a rate as to keep the reaction mixture boiling. After the addition was complete the mixture was boiled under reflux for 1 hour. When cool the pH was adjusted to 7.0 with ammonium hydroxide solution. The precipitate was collected by filtration, washed with water and dried under vacuum at 38°C. to yield D-phenylglycine (0.65g: 74 percent) $[\alpha]_D^{20}$ −158.8°. (1N HCl)

EXAMPLE 15

Hydrolysis of Ethyl D-phenylglycinate-(+)hemitartrate.

A solution of ethyl D-phenylglycinate (+)-hemitartrate ($[\alpha]_D$ − 48.5°, 620 mg., 1.88 mmole) in 6N-hydrochloric acid (1.26 ml., 7.5 mmole, 4 equiv.) was refluxed for 1 hour. Water (6 ml.) was added and the pH of the solution was adjusted to 7.0 with saturated sodium bicarbonate solution (14.0 ml.). D-phenylglycine (98 mg., 35 percent) was precipitated as plates $[\alpha]_D$ − 155° (c 0.965, 1N-HCl) identical to authentic material.

EXAMPLE 16

D-Phenylglycine by Hydrolysis of Methyl D-phenylglycinate

Methyl D-phenylglycinate (20.25 g., 122 mmole, $[\alpha]_D$ −136°) was added to refluxing 6N-hydrochloric acid (86 ml., 515 mmole, 4.2 equiv.) during 5 minutes. The solution was refluxed (110°) for 25 minutes. Water (110 ml.) was added, cooling the solution to 50°. Ammonium hydroxide solution (61 ml. of approx. 10 N, 610 mmole) was added to give a solution of pH 7.0 A solid was precipitated beginning at pH 1.5. The suspension was cooled to 0°, filtered and washed with water to give pale yellow plates (13.08 g., 71 percent) D-phenylglycine. The filtrate (250 ml.) had $[\alpha]_D$ −1.12°; the washings (150 ml.) $[\alpha]_D$ −0.50°. If the rotation of the filtrates was solely caused by phenylglycine with the same specific rotation as the solid then a further 2.5 g. (13 percent) of phenylglycine was present. The solid had $[\alpha]_D$ −154° (c 1.057,1 N-HCl) and − 154° (c 1.001.1 N-HCl), and resembled an authentic sample of phenylglycine (i.r., n.m.r.).

EXAMPLE 17

D-Phenylglycine from Methyl D-phenylglycinate Hydrochloride

Methyl D-phenylglycinate hydrochloride (23.6 g., 110 mmole), was added to boiling 6N-hydrochloric acid (47 ml., approx. 2.8 equivs.), keeping the mixture boiling. The solution was refluxed for 30 minutes, then water (70 ml.) and 0.880 ammonia (35.5 ml.) were added to bring the pH to 7.0. The suspension was cooled to 0°, filtered, washed and dried to give D-phenylglycine as plates (12.89 g., 74 percent) $[\alpha]_D^{21}$ −157° (c 0.998,1N-HCl), $[\alpha]_D^{22}$ −156.5° (c 0.994, 1N-HCl). The filtrate (210 ml., α=−1.47°) and washings (56 ml., α=−0.54°) containing a further 2.15 g. (12 percent) if the rotation was solely caused by dissolved phenylglycine with the same rotation as the precipitated solid.

EXAMPLE 18

D-Phenylglycine from isopropyl D-phenylglycinate hydrochloride

Isopropyl D-phenylglycinate hydrochloride [13.96 g., 0.061 moles, $[\alpha]_D^{23}$ −69° (c 1.00, $H_2O$)] was refluxed in 6N-hydrochloric acid (30.5 ml., 0.183 moles, 3 equiv.) for 1 hour (time until refluxing was 10 minutes). Water (120 ml.) was added, and the solution was cooled in ice and the pH adjusted to 7.0 with 0.880 ammonium hydroxide (25 ml.). The D-phenylglycine was filtered, washed and dried to give plates (5.70 g., 62%), $[\alpha]_D^{24}$ −154.5° (c 1.013,1N-HCl), $[\alpha]_D^{25}$ −155.5° (c 1.0,1N-HCl), The filtrate (218 ml.) and washings (45 ml.) had rotations of −1.45° and −0.54° respectively in a 1 dm. polarimeter tube.

EXAMPLE 19

D-Phenylglycine from ethyl D-phenylglycinate hydrochloride.

Ethyl D-phenylglycinate hydrochloride (9.77g; 0.043 mole, $[\alpha]_D$ −91°; was added to 6N-hydrochloric acid (21.5 ml., 3 equiv.) which was refluxed for 1 hour (time until refluxing 8 minutes). Water (100 ml.) was added, the solution was cooled to 0° and the pH adjusted to 7.0 with 0.880 ammonium hydroxide (16.6 ml.). The phenylglycine was filtered, washed and dried to give plates (4.18 g., 64 percent), $[\alpha]_D^{23}$ −157° (c 1.002,1N-HCl).

EXAMPLE 20

Racemisation of methyl L-phenylglycinate(+)-hemitartrate with sodium hydroxide in dry methanol.

Crude methyl L-phenylglycinate (+)-hemitartrate (3.3g.) $[\alpha]_D$ +68.25° was dissolved in dry methanol (25 ml.) and to this solution was added sodium hydroxide (1.0g.) in methanol (10 ml.). The precipitated sodium tartrate was filtered off and the remaining solution boiled under reflux for 2 hours. When cool, the solution ($[\alpha]_D^{20}$ −0.36°) was adjusted to pH 7.0 with sulphuric acid solution ($H_2SO_4:H_2O$ 2:1) and the precipitated phenylglycine collected by filtration (0.6g: 38 percent) $[\alpha]_D^{20}$ +12°. The remaining methanol solution was evaporated to dryness to give crude methyl phenylglycinate (0.4g: 23 percent) $[\alpha]_D^{20}$ 0°.

EXAMPLE 21

Racemisation of methyl L-phenylglycinate a. Use of sodium methoxide

A solution of optically impure methyl L-phenylglycinate (+)-hemitartrate (2.67 g., the filtrate from a resolution analogous to that of Example 9, $[\alpha]_D$ +64°, containing 0.25 mole excess of tartaric acid) in water (10 ml.) was neutralised to pH 7.0 with ammonium hydroxide (2.0 ml.) and extracted with ethyl acetate. The organic layer was washed, dried, and evaporated to give the crude L-methyl ester (0.741 g., 67 percent) $[\alpha]_D^{22}$ +102° (c 1.02, (1N HCl). The ester was about 75 percent optically pure. Ester prepared in this way (11.2 g.) had a rotation of +88.5° in a 10 cm. polarimeter tube. Sodium methoxide in dry methanol (10 percent NaOMe in 1 ml. methanol) was added and the rotation of the product was found to be +0.95° after 2 hours. The solution was filtered (100 mg. solid), washed with water and extracted into ethyl acetate which was dried and evaporated to give the DL-ester (6.8 g. 61 percent), identical to an authentic sample.

b. Use of aqueous acetic acid.

A solution of methyl L-phenylglycinate (1.05 g.) was refluxed in acetic acid containing 10 percent water (20 ml.) for 1 hour. The rotation of the solution (measured in a 2.5 cm. polarimeter tube) dropped from 4.3° to 0.1°. The solution was cooled and filtered to give a solid (0.262 g.; $[\alpha]_D^{19}$ −0.7° (c 1.00, 1N-HCl) DL-phenylglycine, 27 percent) and a filtrate which was neutralised with sodium bicarbonate and extracted into ethyl acetate. The organic layer was washed, dried, and evaporated to give the DL-ester as an oil (0.383 g., 36.5 percent), $[\alpha]_D$ +3.5° (c 1.04, 1N-HCl).

c. Use of dry acetic acid.

A solution of methyl L-phenylglycinate (1.11 g.) in glacial acetic acid (made up to 10 ml.) had a rotation of +7.4° in a 5 cm. polarimeter tube. The solution was refluxed for 5 minutes and cooled. The rotation was +0.2° in a 5 cm. polarimeter tube, which corresponds to 97 percent racemisation.

EXAMPLE 22

Racemisation of methyl L-phenylglycinate (+)-hemitartrate a. In methanol

The filtrate from Example 9 was evaporated to give the (+)-hemitartrate of methyl L-phenylglycinate (18.0 g., 95 percent, $[\alpha]_D^{18}$ +64 (c 1.00, $H_2O$). A solution of this material (2.0 g.) in methanol (20 ml.) was refluxed for 8 hours, by which time the specific rotation had dropped to +15°, which corresponds to 95 percent racemisation.

b. In I.M.S. containing 10 percent water

A solution of methyl L-phenylglycinate (+)-hemitartrate (10.5 g., $[\alpha]_D$ +64°) in IMS containing 10 percent water and refluxed for 5 hours. The specific rotation dropped to 13.5° (probably mainly the contribution of tartaric acid). A solid (1.036 g., phenylglycine, $[\alpha]_D$ +10°, 21 percent) was precipitated during the reaction. The racemised tartrate contained some ethyl ester hemitartrate.

EXAMPLE 23

Resolution of pure methyl-DL-phenylglycinate with tartaric acid in methanol/1,2-dichloroethane To a solution of L(+)tartaric acid (1.0 g: 0.0067 mole) in methanol/1,2-dichloroethane (30 ml: 2/1) kept at about 50°C was added pure methyl-DL-phenylglycinate (1.0 g: 0.0061 mole).

The solution was allowed to cool to 5°C and was then allowed to stand at that temperature for 16 hours. The hemitartrate crystals were filtered off, washed with a solution of methanol/1,2-dichloroethane and then dried under vacuum at 40°C to yield methyl D(−)-phenylglycinate (+)hemitartrate (0.38 g: 40 percent) $[\alpha]_D^{20}$ −63.2° ($H_2O$).

EXAMPLE 24

Recrystallisation of the methyl D-phenylglycinate hemitartrate

The title hemitartrate (40.0g.) with specific rotation of −62° was recrystallised from hot I.M.S. containing 10 percent water (500 ml.) to give needles (31.3 g: 78 percent), $[\alpha]_D^{21}$ −64° (C 1.0, $H_2O$). The recrystallised sample was again recrystallised to give needles (81 percent yield), m.p. 141°–143°, $[\alpha]_D^{22}$ −64° (C 0.94, $H_2O$), $\nu_{max}$ (nujol) 3480, 3410 (OH), 2650 ($NH_3^+$), 1740 and 1250 ($CO_2R$), 736 and 690 $cm^{-1}$ (Ph), $\tau$ ($D_2O$; 60 MHz) 2.7 (5 proton singlet; Ph), 4.7 (1 proton singlet; CH-Ph), 5.5 (2 proton singlet; $[CHOH]_2$), 6.2 (3 proton singlet; $CO_2Me$). (Found: C, 47.75; H, 5.2; N, 4.0, $C_{13}H_{17}NO_8$. 0.5 $H_2O$ requires C, 47.86; H, 5.5; N, 4.3 percent).

EXAMPLE 25

Recrystallisation of ethyl D-phenylglycinate (+)-hemitartrate

The hemitartrate ($[\alpha]_D$ −46°, 4.5 g.), prepared as in Example 8 (a) was recrystallised from methanol containing 10 percent water (25 ml.) to give a product which was dried at 70 to 80° for 2 hours to give needles (2.725 g., 60 percent) $[\alpha]_D^{22}$ −48° (c 1.018, $H_2O$). These crystals (1.8 g.) were recrystallised similarly from methanol containing 10 percent water (10 ml.) to give the hemitartrate, after drying at 70 to 80° for 3 hours, as needles (1.089 g., 60 percent), $[\alpha]_D^{24}$ −48.5° (c 0.976, $H_2O$).

EXAMPLE 26

Ethyl D-phenylglycinate

A solution of ethyl D-phenylglycinate (+)-hemitartrate (385 mg., 1.17 mmole, $[\alpha]_D$ −48.5°) in water (5 ml.) was treated with saturated sodium bicarbonate solution (4.0 ml.) and extracted into ethyl acetate. The organic layer was washed, dried, and evaporated to give the title ester as a yellow oil (0.215 g., 100 percent), $[\alpha]_D^{22}$ −116° (c 1.00, MeOH), $\nu_{max}$ ($CHBr_3$) 3340 and 3400 ($NH_2$), 1725 ($CO_2R$), $\tau$ ($CDCl_3$), 2.65 (5H, s; Ph), 5.40 (1 H. bs; CH), 5.83 (2 H, q, J 7 Hz; Et), 8.0 (2 H. bs; $NH_2$), 8.81 (3 H, t, J 7 Hz; Et) (Found: C, 65.0; H, 7.1; N, 8.3. $C_{10}H_{13}NO_2$ requires C, 67.0; H, 7.1; N, 7.8 percent $R_f$ 0.4 (Merck plate developed by $CHCl_3$:acetone=4:1, purple colour with ninhydrin spray).

EXAMPLE 27

Methyl D-phenylglycinate

A solution of methyl D-phenylglycinate (+)-hemitartrate (2.07 g., 6.6 mmole, $[\alpha]_D$ −64°) in water (12 ml.) was neutralised to pH 7.0 with sodium bicarbonate and extracted with ethyl acetate. The organic layer was washed, dried and evaporated to give an oil which crystallised on cooling to give the title D-ester (0.63 g., 58 percent) m.p. 29° to 32°, $[\alpha]_D^{23}$ −139° (c 1.023, 1N-HCl), $\nu_{max}$ ($CHBr_3$) 3400 and 3330 ($NH_2$), 1722 $cm.^{-1}$ ($CO_2R$), $\tau$ ($CDCl_3$) 2.65 (5 H, s; Ph), 4.38 (1 H, s; CH), 6.3 (3 H, s; Me), 8.1 (2 H, s; $NH_2$). (Found: C, 65.4; H, 6.6; N, 8.7. $C_9H_{11}NO_2$ requires C, 65.4; H, 6.7; N, 8.5 percent), $R_f$ 0.4 (Merck plate developed by chloroform:acetone=4:1, purple colour with ninhydrin spray).

EXAMPLE 28

Methyl D-phenylglycinate hydrochloride

A solution of methyl D-phenylglycinate (+)-hemitartrate (2.02 g., 6.4 mmole, $[\alpha]_D$ −64° from Example 24) in water (10 ml.) was stirred with calcium chloride dihydrate (0.942 g., 6.4 mmole, 1 equiv.) in water (5 ml.). After 2 hours calcium tartrate was filtered off (0.79 g., 66 percent), and the filtrate was evaporated to dryness to give the hydrochloride as a white powder (2.190 g., 170 percent, but hydrated, and containing inorganic material) $[\alpha]_D^{23}$ −64°(c 1.00, $H_2O$).

EXAMPLE 29

Ethyl D-phenylglycinate hydrochloride

Ethyl D-phenylglycinate hemitartrate (1.149 g., $[\alpha]_D$ −46°), made as in Example 8(a), in water (5 ml.) was neutralised to pH 7.0 and extracted with ethyl acetate. The organic layer was washed with water then extracted into 2N-hydrochloric acid. The acid layer was evaporated to dryness to give the hydrochloride (0.712 g., 95 percent), $[\alpha]_D^{22}$ −85.5° (c 1.01, $H_2O$).

EXAMPLE 30

Resolution of methyl DL-phenylglycinate in methanol containing dichloroethane

A solution of methyl DL-phenylglycinate (970 mg., 5.9 mmole) and (+)-tartaric acid (980 mg 6.5 mmole 1.1 equiv.) was dissolved in methanol:dichloroethane (1:1; 5 ml.) and seeded with a pure sample of the hemitartrate. After 29 hours at 20° to 25° the solid was filtered, washed, and dried at 70° to 80°/2mm for 2 hours to give the hemitartrate (0.454 g., 49 percent) $[\alpha]_D^{23}$ −61.5° (c 1.00, $H_2O$).

EXAMPLE 31

Resolution of methyl DL-phenylglycinate in ethanol containing dimethylsulphoxide A solution of methyl DL-phenylglycinate (2.02 g., 12.2 mmole) and (+)-tartaric acid (1.91 g., 12.8 mmole, 1.05 equiv.) in ethanol containing 9 percent v/v dimethylsulphoxide (45 ml.) was seeded with optically pure methyl D-phenylglycinate (+)-hemitartrate. The solution crystallised at 28° was cooled to −4°, filtered, washed, and dried at 70° to 80°/2mm to give the hemitartrate (1.56 g., 85 percent), $[\alpha]_D^{22}$ −61° (c 1.00 $H_2O$).

EXAMPLE 32

Resolution of methyl DL-phenylglycinate in ethanol containing acetic acid

A solution of methyl DL-phenylglycinate (2.00 g., 12.1 mmole) and (+)-tartaric acid (1.89 g 12.7 mmole, 1.05 equiv.) in ethanol containing 9 percent v/v acetic acid (45 ml.) was seeded with optically pure methyl D-phenylglycinate (+)-hemitartrate. The solution crystallised immediately at 28°, and was cooled to −4°, filtered, washed, and dried at 70° to 80°/2mm to give the hemitartrate (1.585 g., 85 percent), $[\alpha]_D^{22}$ −59° (c 1.00, $H_2O$).

Similar resolutions are shown below in table 1.

TABLE 1

| ester % | Co-solvent | Co-solvent % | Yield % | $[\alpha]_D$ |
|---|---|---|---|---|
| 4.3 | 10% water 15% acetic acid | 25 (total) | 55 | −56 |
| 4.5 | Dimethylformamide | 9 | 95 | −54 |

EXAMPLE 33
Resolution of ethyl DL-phenylglycinate in 10 percent aqueous ethanol Ethyl DL-phenylglycinate (4.00 g., 22.4 mmole) and (+)-tartaric acid were dissolved in 10 percent aqueous ethanol (90 ml.) at 50°, cooled and seeded with optically pure hemitartrate. After 20 hours at 20° the fine needles were filtered, washed, and dried at 20°/1mm for 3 hours to give the hemitartrate (1.46 g., 38 percent), $[\alpha]_D^{20}$ −48° (c 3.13, $H_2O$).

The filtrate was cooled to 3° to give a second crop (1.10 g., 27 percent), $[\alpha]_D^{20}$ −50° (c 2.8, $H_2O$). This filtrate was cooled to −27° to give a third crop (310 mg., 7.5 percent), $[\alpha]_D^{20}$ −41° (c 2.1, $H_2O$).

EXAMPLE 34
Resolution of ethyl DL-phenylglycinate in 7.5 percent aqueous ethanol A solution of ethyl DL-phenylglycinate (5.15 g., 28.8 mmole) and (+)-tartaric acid (4.85 g., 32 mmole, 1.1 equiv.) in 7.5 percent aqueous ethanol (53 ml.) at 55° was cooled seeded then allowed to crystallise at 4°. The product was filtered, washed, and dried at 20°/2mm for 3 hours to give the hemitartrate (4.17 g., 78 percent), $[\alpha]_D$ −45° (c 2.53, $H_2O$).

EXAMPLE 35
Resolution of ethyl DL-phenylglycinate in ethanol containing

A. 5 percent Acetic Acid

A solution of ethyl DL-phenylglycinate (950 mg., 5.4 mmole) and (+)-tartaric acid (939 mg., 6.2 mmole, 1.18 equiv.) in ethanol containing 5 percent acetic acid (19 ml) at 60° was cooled and seeded. It was crystallised at 4°, filtered, washed, and dried at 70°/2mm to give the hemitartrate (709 mg., 80 percent), $[\alpha]_D^{25}$ −36° (c 2.5 $H_2O$). The filtrate was racemised by keeping it at 40° for 4 days. It was cooled to 4° to give a second crop (273 mg., 31 percent), $[\alpha]_D^{25}$ −46° (c 2.40, $H_2O$).

B. 10 percent Acetic acid

As in Example A, but using 10 percent v/v acetic acid and a 5 percent solution of the ester to give the hemitartrate (63 percent), $[\alpha]_D^{25}$ −42.5° (c 2.5, $H_2O$) and similarly a second crop (21 percent), $[\alpha]_D^{25}$ −48° (c 2.0, $H_2O$).

C. 15 percent Acetic acid

As in Example A, but using 15 percent v/v acetic acid and a 15 percent solution of the ester, to give the hemitartrate (81 percent), $[\alpha]_D^{25}$ −33° (c 2.4, $H_2O$) and a second crop (13 percent), $[\alpha]_D^{25}$ −38° (c 2.4, $H_2O$).

EXAMPLE 36
Resolution of ethyl DL-phenylglycinate in ethanol containing 10 percent dimethylsulphoxide A solution of ethyl DL-phenylglycinate (900 mg., 5 mmole) and (+)-tartaric acid (900 mg., 6 mmole, 1.2 equiv.) in ethanol containing 10 percent v/v dimethylsulphoxide (12.5 ml) at 50° was cooled and seeded. The mixture was crystallized at 4°, then filtered, washed, and dried at 70°/2mm to give the hemitartrate (560 mg., 64 percent), $[\alpha]_D^{20}$ −43° (c 1.00, $H_2O$).

EXAMPLE 37
Resolution and Racemisation of ethyl DL-phenylglycinate in ethanol with 10 percent dimethylsulphoxide A mixture of ethyl DL-phenylglycinate (4.85 g., 27.1 mmole) and (+)-tartaric acid (4.065 g., 27.1 mmole, 1 equiv.) was stirred in ethanol containing 10 percent dimethylsulphoxide (50 ml.); crystallisation had occurred after 10 minutes. The mixture was stirred at 20° for 10 days to give the hemitartrate (4.886 g., 96 percent), $[\alpha]_D^{21}$ −46.8° (c 2.504, water).

The filtrate was concentrated to 21 ml then racemised by keeping it at 40° for 8 days. Ethanol (29 ml.) was added and the solution was crystallised at 4° to give a second crop (1.739 g., 34 percent), $[\alpha]_D$ −45.5° (c 2.483, water).

EXAMPLE 38
Resolution and racemisation of ethyl DL-phenylglycinate in ethanol containing 10 percent acetic acid A solution of ethyl DL-phenylglycinate (3.62 g., 20.3 mmole) and (+)-tartaric acid (3.05 g., 20.4 mmole, 1 equiv.) in ethanol containing 10 percent v/v acetic acid (38 ml.) was stirred at 20°. After 5 minutes crystallisation began. The mixture was filtered after 12 days, washed and dried at 20°/2 mm. to give the hemitartrate (4.157 g., 109 percent) $[\alpha]_D^{22}$ −42.5° (c 2.99, $H_2O$).

The filtrate was racemised by heating at 40° for 4 days. It was stirred at 20° for 3 days then at 4° for 3 days, filtered washed and dried at 20°/3mm to give a second crop of the hemitartrate (0.711 g., 19 percent), $[\alpha]_D$ −41.8° (c 2.497, $H_2O$).

EXAMPLE 39
Racemisation of methyl and ethyl L-phenylglycinate (+)-hemitartrates The results are summarised in Tables 2 and 3. The following is a typical procedure.

A solution of the L-hemitartrate (often the filtrate from a resolution) in the stated solvent was kept at various temperatures. The rotation of the solution was measured at intervals. The time for the rotation to fall to a point half-way between the initial rotation and the racemic value was noted and is shown in Tables 2 and 3.

TABLE 2

Racemisation of methyl L-phenylglycinate hemitartrate in ethanol and methanol and showing the effect of polar and non-polar additives

| No. | Solvent | % hemitartrate | Temperature | Conditions | Time for 50% racemisation |
|---|---|---|---|---|---|
| 1 | Ethanol | 1 | 60° | | ca 14 hours |
| 2 | Ethanol | 1 | 60° | + 10% v/v dimethyl formamide | 6.5 hours |
| 3 | Ethanol | 1 | 60° | + 10% v/v dimethyl sulphoxide | 5.3 hours |
| 4 | Ethanol | 1 | 60° | + 10% v/v formamide | 4.1 hours |
| 5 | Methanol | 5 | 60° | + 20% v/v dichloroethane | 6.1 hours |

TABLE 2 — Continued

Racemisation of methyl L-phenylglycinate hemitartrate
in ethanol and methanol and showing the effect of polar and non-polar additives

| No. | Solvent | % hemitartrate | Temperature | Conditions | Time for 50% racemisation |
|---|---|---|---|---|---|
| 6 | Methanol | 5 | 60° | + 20% v/v acetonitrile | 5.6 hours |
| 7 | Methanol | 5 | 60° | | 3.9 hours |
| 8 | Methanol | 10 | Reflux | | 2.8 hours |

TABLE 3

Racemisation of ethyl L-phenylglycinate hemitartrate in ethanol

| No. | % hemitartrate | Temperature | Conditions | Time for 50% racemisation |
|---|---|---|---|---|
| 1 | 5 | 20–25° | + 10% v/v DMSO | 100 hours |
| 2 | 5 | 20–25° | + 11.6 moles acetic acid (10%) | 100 hours |
| 3 | 1 | 40° | | 50 hours |
| 4 | 5 | 40° | + 11.6 moles acetic acid | 21.2 hours |
| 5 | 5 | 40° | + 10% v/v DMSO | 20 hours |
| 6 | 1 | 50° | | 25 hours |
| 7 | 2 | 50° | + 1 mole tartaric acid | 21.4 hours |
| 8 | 2 | 50° | + 5 moles tartaric acid | 21.4 hours |
| 9 | 2 | 50° | + 1 mole acetic acid | 9.2 hours |
| 10 | 2 | 50° | + 5 moles acetic acid | 6.9 hours |
| 11 | 2 | 50° | + 10 moles acetic acid | 5.2 hours |
| 12 | 1 | 65° | | 7.9 hours |
| 13 | 1 | 80° | | 2.5 hours |

EXAMPLE 40

Resolution of pure methyl-DL-phenylglycinate with tartaric acid in methanol/methylene chloride To a solution of (+)tartaric acid (1.0 g: 0.0067 mole) in methanol/methylene chloride (30 mls:½) kept at a temperature of about 50°C was added pure methyl-DL-phenylglycinate (+)-hemitartrate (1.0 g: 0.0061 mole). The solution was allowed to cool to 5°C and was then allowed to stand at that temperature for 16 hours. The hemitartrate crystals were filtered off, washed with a solution of methanol/methylene chloride and then dried under vacuum at 40°C to yield D(+)phenylglycine methyl ester (+)hemitartrate (0.71 g:74 percent yield) $[\alpha]_D^{20}$ −59.9° ($H_2O$).

What is claimed is:

1. A process for the resolution of a DL-phenylglycine ester of the formula:

$$C_6H_5CH \cdot NH_2 \cdot CO_2R$$

where R represents an alkyl group with 1 to 6 carbon atoms or a cycloalkyl group withh 5 or 6 carbon atoms, which comprises treating said DL-phenylglycine ester with (+)-tartaric acid at a temperature of from 15° to 60°C in the presence of a mixture of solvents of different polarities one of which is an alkanol having 1–4 carbon atoms, the said (+)-tartaric acid being used in a stoichiometric amount or in an excess up to 100 percent, and selectively crystallising the (+)-hemitartrate of the D-phenylglycine ester therefrom at a temperature of from −20° to +60°C.

2. A process as claimed in claim 1 wherein a DL-phenylglycine ester is used in which R represents a methyl, ethyl, isopropyl, butyl, isobutyl or cyclohexyl group.

3. A process as claimed in claim 1 wherein said mixture of solvents contains a solvent selected from among the following: water, sulphoxide solvents, nitrile solvents, amide solvents, ester solvents, carboxylic acid solvents and hydrocarbon and chlorinated hydrocarbon solvents.

4. A process as claimed in claim 1 wherein the alkanol is methanol.

5. A process as claimed in claim 1 wherein the alkanol is ethanol.

6. A process as claimed in claim 1 wherein said mixture of solvents contains water.

7. A process as claimed in claim 3 wherein said sulphoxide solvent comprises dimethylsulphoxide.

8. A process as claimed in claim 1 for the resolution of ethyl DL-phenylglycinate wherein the resolution is effected in the presence of aqueous methanol or aqueous ethanol as solvent.

9. A process as claimed in claim 1 for the resolution of methyl DL-phenylglycinate wherein the resolution is effected in the presence of aqueous ethanol or aqueous industrial methylated spirit (I.M.S.) as solvent.

10. A process as claimed in claim 1 wherein the (+)-hemitartrate of the D-phenylglycine ester thus obtained is hydrolysed in an aqueous solution of a strong acid, whereby a salt of D-phenylglycine is obtained.

11. A process as claimed in claim 10 wherein the pH of the hydrolysis mixture, containing the salt of D-phenylglycine thus formed, is adjusted to the range 4–9 whereby D-phenylglycine is obtained.

12. A process for the resolution of a DL-phenylglycine ester of the formula $$C_6H_5CH \cdot NH_2 \cdot CO_2R$$

where R represents an alkyl group with 1 to 6 carbon atoms or a cycloalkyl group with 5 or 6 carbon atoms, which comprises the resolution steps of treating said DL-phenylglycine ester with (+)-tartaric acid at a temperature of from 15° to 60°C in the presence of a mixture of solvents of different polarities one of which is an alkanol having 1 to 4 carbon atoms, the said (+)-tartaric acid being used in a stoichiometric amount or in an excess up to 100 percent, and selectively crystallising the (+)-hemitartrate of the D-phenylglycine ester therefrom at a temperature of from −20° to +60°C; separating said crystallized (+)-hemitartrate from the remaining L-phenylglycine ester or salt thereof, racemising said remaining L-phenylglycine ester or salt thereof and resolving said racemate by repeating said resolution steps.

13. A process as claimed in claim 12 in which racemisation is effected by heating the L-phenylglycine ester or salt alone or in solution, either in the solvent mixture used for resolution or in a different solvent medium.

14. A process as claimed in claim 13 in which, in order to racemise any L-phenylglycine ester, a base or a weak acid is added to the solution.

15. A process as claimed in claim 12 in which said racemisation takes place simultaneously with resolution.

16. A compound of the general formula:

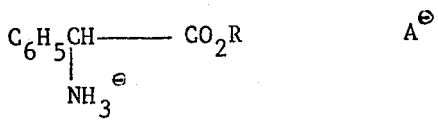

wherein $A^{\ominus}$ represents the (+)-hemitartrate anion and R represents an alkyl group with 1 to 6 carbon atoms or a cycloalkyl group with 5 or 6 carbon atoms in substantially optically pure form.

17. A compound as claimed in claim 16 selected from the group consisting of
D-phenylglycine methyl ester (+)-hemitartrate in substantially optically pure form;
D-phenylglycine ethyl ester (+)-hemitartrate in substantially optically pure form; and
D-phenylglycine isopropyl ester (+)-hemitartrate in substantially optically pure form.

18. D-phenylglycine methyl ester in substantially optically pure form; or
D-phenylglycine ethyl ester in substantially optically pure form.

* * * * *